United States Patent
Choi et al.

(10) Patent No.: US 9,624,409 B2
(45) Date of Patent: Apr. 18, 2017

(54) ADHESIVE COMPOSITION

(71) Applicant: DONGWOO FINE-CHEM CO., LTD., Iksan-si, Jeollabuk-do (KR)

(72) Inventors: Han Young Choi, Pyeongtaek-si (KR); Hyerim Kwon, Seo-gu (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 14/906,673

(22) PCT Filed: Jul. 16, 2014

(86) PCT No.: PCT/KR2014/006447
§ 371 (c)(1),
(2) Date: Jan. 21, 2016

(87) PCT Pub. No.: WO2015/012525
PCT Pub. Date: Jan. 29, 2015

(65) Prior Publication Data
US 2016/0160095 A1    Jun. 9, 2016

(30) Foreign Application Priority Data

Jul. 22, 2013  (KR) .................. 10-2013-0086097

(51) Int. Cl.
| | |
|---|---|
| *C09J 133/08* | (2006.01) |
| *C09J 133/06* | (2006.01) |
| *C09J 175/04* | (2006.01) |
| *C08G 18/62* | (2006.01) |
| *C08G 18/80* | (2006.01) |
| *C09J 9/00* | (2006.01) |
| *C09J 11/04* | (2006.01) |
| *C09J 11/06* | (2006.01) |
| G02B 5/30 | (2006.01) |
| C08K 5/544 | (2006.01) |
| C08K 5/548 | (2006.01) |
| C08K 3/30 | (2006.01) |
| C08K 5/3432 | (2006.01) |
| C08K 5/5455 | (2006.01) |

(52) U.S. Cl.
CPC ........ *C09J 133/08* (2013.01); *C08G 18/6254* (2013.01); *C08G 18/8029* (2013.01); *C09J 9/00* (2013.01); *C09J 11/04* (2013.01); *C09J 11/06* (2013.01); *C09J 133/066* (2013.01); *C09J 175/04* (2013.01); *C08K 3/30* (2013.01); *C08K 5/3432* (2013.01); *C08K 5/544* (2013.01); *C08K 5/548* (2013.01); *C08K 5/5455* (2013.01); *G02B 5/3025* (2013.01)

(58) Field of Classification Search
CPC ...... C09J 133/08; C09J 133/066; C09J 11/06; C09J 11/04; C09J 9/00; C08G 18/6254; C08G 18/8029; C08K 5/5455; C08K 5/3432; C08K 5/544; C08K 5/548; C08K 3/30; G02B 5/3025
See application file for complete search history.

(56) References Cited

U.S. PATENT DOCUMENTS

| | | | |
|---|---|---|---|
| 4,861,839 A | 8/1989 | Mizuguchi et al. | |
| 2011/0117296 A1 | 5/2011 | Jang et al. | |
| 2012/0123046 A1 | 5/2012 | Niwa et al. | |

FOREIGN PATENT DOCUMENTS

| | | |
|---|---|---|
| EP | 0 295 657 A2 | 12/1988 |
| JP | 4-223403 A | 8/1992 |
| KR | 10-0671400 B1 | 1/2007 |
| KR | 10-0840114 B1 | 6/2008 |
| KR | 10-2012-0038633 A | 4/2012 |
| KR | 10-1134553 B1 | 4/2012 |
| KR | 10-2012-0051590 A | 5/2012 |

OTHER PUBLICATIONS

International Searching Authority, International Search Report of PCT/KR2014/006447, dated Sep. 26, 2014. [PCT/ISA/210].
International Searching Authority, Written Opinion of PCT/KR2014/006447, dated Sep. 26, 2014. [PCT/ISA/237].

*Primary Examiner* — Robert Jones, Jr.
(74) *Attorney, Agent, or Firm* — Sughrue Mion, PLLC

(57) ABSTRACT

Provided is an adhesive composition whose initial adhesive strength (A) and adhesive strength at increased temperature (B) satisfy a ratio (B/A) of 2.0 or lower, wherein the (A) value is measured through a peeling test after a sample is left for 24 hours at 23° C. and 50% relative humidity, and the (B) value is measured through a peeling test after a sample is left for 48 hours at 50° C. and 50% RH; the sample is prepared by laminating an adhesive-attached polarizing plate having a size of 25 mm×100 mm on a substrate at a pressure of 0.25 MPa and treating the laminate in an autoclave, the adhesive being formed from the adhesive composition; and the peeling test is performed by peeling the adhesive from the glass substrate at a peeling rate of 300 mm/min and a peeling angle of 180° using a universal testing machine.

12 Claims, No Drawings

ADHESIVE COMPOSITION

CROSS REFERENCE TO RELATED APPLICATIONS

This application is a National Stage of International Application No. PCT/KR2014/006447 filed Jul. 16, 2014, claiming priority based on Korean Patent Application No. 10-2013-0086097, filed Jul. 22, 2013, the contents of all of which are incorporated herein by reference in their entirety.

BACKGROUND OF THE INVENTION

1. Field of the Invention

The present invention relates to an adhesive composition having excellent adhesive durability and reworkability.

2. Description of the Prior Art

In general, a liquid crystal display (LCD) is composed of polarizing plates and a liquid crystal cell containing liquid crystals. Several optical films (retardation plate, viewing angle expansion film, brightness enhancement film, and the like) are used to improve the display quality of the LCD.

These polarizing plates and optical films are bonded to the liquid crystal cell by using an adhesive. For the adhesive, an acryl-based adhesive containing an acryl-based polymer having excellent adhesiveness and transparency as a base material is typically used. The cross-linkage of the acryl-based adhesive employs the linkage of a cross-linking agent with a functional monomer of the acryl-based polymer.

An adhesive composition containing a silane-based Compound having an epoxy group has been known as an adhesive [Japanese Patent Publication No. Hei 4-223403]. However, the above-mentioned adhesive cannot retain such an adhesive strength as required in a real usage environment. Moreover, the adhesive strength of the adhesive may excessively increase under high temperature and humidity conditions or the adhesive may be remained on a substrate when being peeled again.

In addition, an adhesive composition containing a silane-based compound having a cyano acetyl group [Korean Patent No. 840114] and an adhesive composition containing a silane-based compound having an acetoacetyl group [Korean Patent No. 6714000] have been proposed. The above-mentioned adhesives have excellent reworkability since the adhesive strength of the adhesives does not excessively increase under high temperature and humidity conditions and thus the adhesives are not remained on a substrate when being peeled again. However, the initial adhesive strength of the adhesives is relatively low and the adhesive durability of the adhesives under strict conditions (high temperature or high temperature and humidity) becomes deteriorated.

SUMMARY OF THE INVENTION

The present invention has been made to solve the above-mentioned problems occurring in the prior art, and an aspect of the present invention is to provide an adhesive composition which has excellent adhesive durability under strict conditions (high temperature or high temperature and humidity) and has excellent reworkability without an excessive increase in an adhesive strength under the strict conditions.

In accordance with an aspect of the present invention, there is provided an adhesive composition whose initial adhesive strength (A) and adhesive strength at increased temperature (B) satisfy a ratio (B/A) of 2.0 or lower, wherein the initial adhesive strength (A) is measured through a peeling test after a sample is left for 24 hours at 23° C. and 50% relative humidity (RH), and the adhesive strength at increased temperature (B) is measured through a peeling test after a sample is left for 48 hours at 50° C. and 50% RH;

the sample is prepared by laminating an adhesive-attached polarizing plate having a size of 25 mm×100 mm on a glass substrate at a pressure of 0.25 MPa and treating the laminate in an autoclave, the adhesive being formed from the adhesive composition; and the peeling test is performed by peeling the adhesive from the glass substrate at a peeling rate of 300 mm/min and a peeling angle of 180° C. using a universal testing machine (UTM).

The ratio (B/A) of the adhesive strength at increased temperature (B) to the initial adhesive strength (A) may be 1.5 or lower.

The initial adhesive strength may be 2 to 10 N/25 mm.

The adhesive strength at increased temperature may be 2.5 to 15 N/25 mm.

The adhesive composition may contain an acryl-based copolymer and at least one silane-based compound selected from the group consisting of compounds of Chemical Formulas 1 to 6 below:

[Chemical Formula 1]
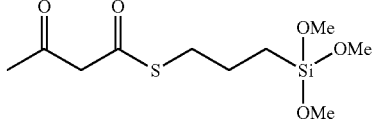

[Chemical Formula 2]
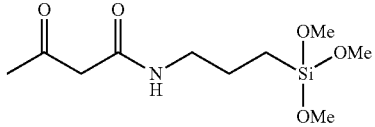

[Chemical Formula 3]
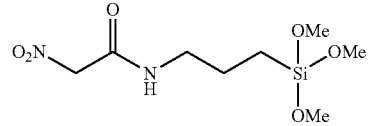

[Chemical Formula 4]
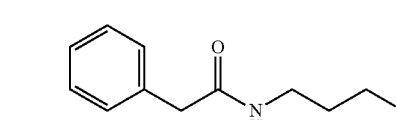

[Chemical Formula 5]
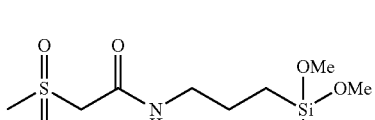

[Chemical Formula 6]
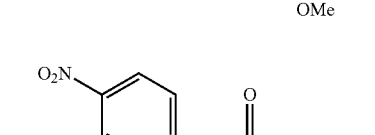

The silane-based compound may be contained in content of 0.01 to 5 parts by weight based on 100 parts by weight of the acryl-based copolymer.

The adhesive composition may further include a cross-linking agent.

The cross-linking agent may be a tolylene diisocyanate-based cross-linking agent.

The adhesive composition may further include an anti-static agent.

The anti-static agent may contain an anion of a fluorine-containing organic or inorganic salt.

DETAILED DESCRIPTION OF THE PREFERRED EMBODIMENTS

The present invention is directed to an adhesive composition having excellent adhesive durability and reworkability.

Hereinafter, the present invention will be described in detail as follows.

The adhesive composition of the present invention has an initial adhesive strength (A) and an adhesive strength at increased temperature (B) satisfying a ratio (B/A) of 2.0 or lower, preferably 1.5 or lower, more preferably 1.3 or lower, wherein the initial adhesive strength (A) is measured through a peeling test after a sample is left for 24 hours at 23° C. and 50% relative humidity (RH), and the adhesive strength at increased temperature (B) is measured through a peeling test after a sample is left for 48 hours at 50° C. and 50% RH; the sample is prepared by laminating an adhesive-attached polarizing plate having a size of 25 mm×100 mm on a glass substrate at a pressure of 0.25 MPa and treating the laminate in an autoclave, the adhesive being formed from the adhesive composition; and the peeling test is performed by peeling the adhesive from the glass substrate at a peeling rate of 300 mm/min and a peeling angle of 180° using a universal testing machine (UTM).

Generally, the initial adhesive strength may be an indicator of peeling stability against moisture during transport and durability such as heat resistance and moisture-heat resistance. In addition, the adhesive strength at increased temperature may be an indicator of reworkability for peeling and re-bonding due to defects at the time of manufacturing panels. When the ratio of the adhesive strength at increased temperature to the initial adhesive strength is closer to 1, both the durability and reworkability can be satisfied.

Specifically, the high adhesive strength suppresses the problem of bubbling or peeling defects between an adhesive layer and a glass layer, the problem being caused by contraction or expansion of a polarizing plate under conditions of heat resistance or moisture-heat resistance, and thus can satisfy the durability.

In addition, the defects occurring at the time of manufacturing of the panels undergo a rework process for re-bonding after peeling. Here, the rework process may be conducted before thermal treatment or after thermal treatment, or may be conducted after a significant amount of time has lapsed. Therefore, in the development of an adhesive, the reworkability is evaluated by the adhesive strength at increased temperature, in consideration of a factor associated with the time of the rework process. However, the high adhesive strength at increased temperature may cause failures, such as a panel breaking due to high adhesive strength, an adhesive remaining, and a polarizing plate tearing.

Therefore, in order to satisfy both durability and reworkability, it is preferable that the initial adhesive strength (A) is high and the adhesive strength at increased temperature (B) is not too high as compared with the initial adhesive strength (A).

That is, the present invention is characterized in that the ratio (B/A) of the adhesive strength at increased temperature (B) to the initial adhesive strength (A) is maintained at 2.0 or lower in order to satisfy both durability and reworkability. If the ratio (B/A) is higher than 2.0, the reworkability may be poor despite of excellent durability, so that it is difficult to satisfy both the durability and reworkability.

In addition, the initial adhesive strength is 2 to 10 N/25 mm, and preferably within the range of 1 to 10 N/25 mm. If the adhesive strength is lower than 2 N/25 mm, peeling defects may occur due to changes in environment, such as moisture and temperature, during transport. If the adhesive strength is higher than 10 N/25 mm, the adhesive strength at increased temperature excessively increases during thermal treatment, causing problems in reworkability.

The adhesive strength at increased temperature is 2.5 to 15 N/25 mm, and preferably within the range of 8 to 15 N/25 mm. If the adhesive strength at increased temperature is lower than 2.5 N/25 mm, peeling defects may occur at the time of evaluation of heat resistance or moisture-heat resistance. If the adhesive strength at increased temperature is higher than 15 N/25 mm, defects may occur, such as a panel breaking due to high adhesive strength, an adhesive remaining, and a polarizing plate tearing.

This ratio between the adhesive strengths may be controlled by adjusting the kinds of components contained in the adhesive composition and the contents of the components.

The adhesive composition according to the present invention contains an acryl-based copolymer and a silane-based compound.

Preferably, the acryl-based copolymer contains an alkyl (meth)acrylate monomer with 4-12 carbon atoms and a polymerizable monomer having a cross-linkable functional group. Here, the term (meth)acrylate refers to acrylate and methacrylate.

The alkyl (meth)acrylate monomer with 4-12 carbon atoms is (meth)acrylate derived from an aliphatic alcohol with 4-12 carbon atoms, and examples thereof may include n-butyl(meth)acrylate, 2-butyl(meth)acrylate, t-butyl(meth)acrylate, pentyl(meth)acrylate, octyl(meth)acrylate, 2-ethylhexyl(meth)acryiate, nonyl(meth)acrylate, decyl(meth)acrylate, lauryl(meth)acrylate, and the like. They may be used alone or in a mixture of two or more thereof. Of these, n-butylacrylate, 2-ethylhexylacrylate, or a mixture thereof may be preferable.

The polymerizable monomer having a cross-linkable functional group serves to give the cohesive strength or adhesive strength by a chemical linkage with cross-linking agents which will be mentioned below. Examples thereof may include a monomer having a hydroxyl group, a monomer having a carboxyl group, a monomer having an amide group, a monomer having a tertiary amine group, and the like. These may be used alone or in a mixture of two or more.

Examples of the monomer having a hydroxyl group may include 2-hydroxyethyl(meth)acrylate, 2-hydroxypropyl(meth)acrylate, 2-hydroxybutyl(meth)acrylate, 4-hydroxybutyl(meth)acrylate, 6-hydroxyhexyl(meth)acrylate, 2-hydroxyethyleneglycol(meth)acrylate, 2-hydroxypropyleneglycol(meth)acrylate, hydroxyalkyleneglycol(meth)acrylate having an alkylene group with 2-4 carbon atoms, 4-hydroxybutylvinylether, 5-hydroxypentylvinylether, 6-hydroxyhexylvinylether, 7-hydroxyheptylvinylether, 8-hydroxyoctylvinylether, 9-hydroxynonylvinylether, 10-hydroxydecylvinylether, and the like. Of these, 4-hydroxybutylvinylether is preferable.

Examples of the monomer having a carboxyl group may include monovalent acids including (meth)acrylic acid, crotonic acid, and the like; bivalent acids including maleic acid, itaconic acid, fumaric acid, and the like, and their monoalkyl esters; 3-(meth)acryloylpropionic acid; a ring-opening adduct of succinic anhydride of 2-hydroxyalkyl(meth)acrylate having an alkyl group with 2-3 carbon atoms, a ring-opening adduct of succinic anhydride of hydroxyalkyleneglycol(meth)acrylate having an alkylene group with 2-4 carbon atoms, and a compound obtained by ring-opening addition of succinic anhydride to a carprolactone adduct of 2-hydroxyalkyl (meth)acrylate having an alkyl group with 2-3 carbon atoms; and the like. Of these, (meth)acrylic acid is preferable.

Examples of the monomer having an amide group may include (meth)acrylamide, N-isopropylacrylamide, N-tertiarybutylacrylamide, 3-hydroxypropyl(meth)acrylamide, 4-hydroxybutyl(meth)acrylamide, 6-hydroxyhexyl(meth)acrylamide, 8-hydroxyoctyl(meth)acrylamide, 2-hydroxyethylhexyl(meth)acrylamide, and the like. Of these, (meth)acrylamide is preferable.

Examples of the monomer having a tertiary amine group may include N,N-(dimethylamino)ethyl(meth)acrylate, N,N-(diethylamino)ethyl(meth)acrylate, N,N-(dimethylamino)propyl (meth)acrylate, and the like.

The polymerizable monomer is contained in a content of preferably 0.05 to 10 parts by weight, and more preferably 0.1 to 8 parts by weight, based on 100 parts by weight of the alkyl (meth)acrylate monomer having 4-12 carbon atoms. Less than 0.05 parts by weight thereof may reduce the cohesive strength of an adhesive, thereby causing deterioration in durability. More than 10 parts by weight thereof may reduce the adhesive strength of an adhesive due to a high gel fraction and cause a problem in durability.

Further, other polymerizable monomers, in addition to the above monomers, may be further contained within such a range as not to reduce the adhesive strength of an adhesive, for example, in a content of no more than 40 parts by weight based on 100 parts by weight of all the monomers used for the preparation of the acrylic copolymer.

The preparation method of the copolymer is not particularly limited. The copolymer may be prepared by methods such as bulk polymerization, solution polymerization, emulsion polymerization, and suspension polymerization, which are conventionally used in the art. Of these, the solution polymerization is preferable. In addition, a solvent, a polymerization initiator, a chain transfer agent for molecular weight control, and the like, which are conventionally used for the polymerization, may be used.

The silane-based compound serves as a silane coupling agent since a silane group performs a condensation reaction with glass and an organic functional group performs a reaction with a polymer or a cross-linking agent, thereby finally linking the glass and the polymer, leading to the improvement in adhesive strength and adhesive durability.

Silane coupling agents are classified into a nucleophilic silane coupling agent, an electrophilic silane coupling agent, and a non-reactive silane agent, based on the type of an organic functional group. The organic functional group of the silane coupling agent may be optionally used according to the kind and content of the cross-linkable monomer contained in the polymer or the kind of the cross-linkable functional group of the cross-linking agent.

The silane coupling agent of the present invention is not particularly limited as long as it can satisfy the desired ratio of the adhesive strength at increased temperature to the initial adhesive strength, as described above. However, the present invention may contain at least one silane-based compound selected from the group consisting of compounds of Chemical Formulas 1 to 6, which can prevent the excessive reduction of the initial adhesive strength.

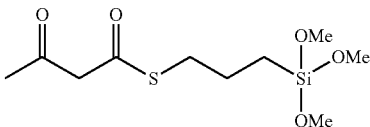

[Chemical Formula 1]

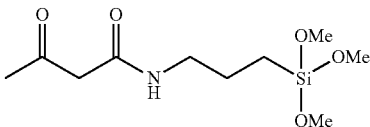

[Chemical Formula 2]

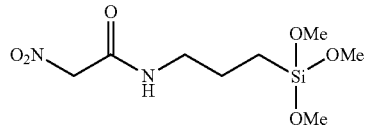

[Chemical Formula 3]

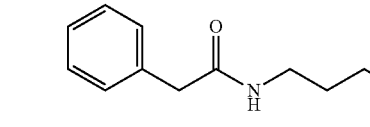

[Chemical Formula 4]

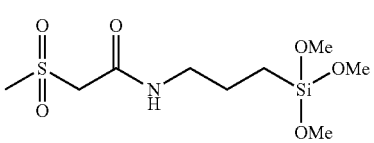

[Chemical Formula 5]

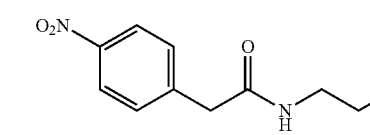

[Chemical Formula 6]

This silane-based compound may be contained in a content of 0.01 to 5 parts by weight, and preferably 0.1 to 1.0 part by weight, based on 100 parts by weight of the acryl-based copolymer. If the content of the silane-based compound is less than 0.01 parts by weight or more than 5 parts by weight, the durability may deteriorate regardless of the ratio of the adhesive strength at increased temperature to the initial adhesive strength.

The cross-linking agent can improve adhesiveness and durability, maintain reliability at high temperatures, and retain the shape of the adhesive.

Examples of the cross-linking agent may include isocyanate-based, epoxy-based, melamine-based, peroxide-based, metal chelate-based, and oxazoline-based cross-linking agents, and the like. One or a mixture of two or more thereof may be used. Of these, isocyanate-based or epoxy-based cross-linking agents may be preferable.

Examples of the isocyanate-based cross-linking agent may include diisocyanate compounds such as tolylene diisocyanate, xylene diisocyanate, 2,4-diphenylmethane diisocyanate, 4,4-diphenylmethane diisocyanate, hexamethylene diisocyanate, isophorone diisocyanate, tetramethyl xylene diisocyanate, and naphthalene diisocyanate; an adduct obtained by a reaction of 3 moles of a diisocyanate compound with 1 mole of a polyhydric alcohol-based compound such as trimethylol propane or the like, an isocyanurate obtained by self-condensation of 3 moles of a diisocyanate compound, a biuret obtained by condensation of diisocyanate urea obtained from 2 moles of 3 moles of a diisocyanate compound with the remaining 1 mole of the diisocyanate compound, and multifunctional isocyanate compounds having three functional groups, such as triphenylmethane triisocyanate and methylene bistriisocyanate; and the like.

In consideration of adhesive durability such as heat resistance, tolylene diisocyanate-based is more preferable in the isocyanate-based cross-linking agents.

Examples of the epoxy-based cross-linking agent may include ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, polytetramethylene glycol diglycidyl ether, glycerol diglycidyl ether, glycerol triglycidyl ether, diglycerol polyglycidyl ether, polyglycerol polyglycidyl ether, resorcin diglycidyl ether, 2,2-dibromo neopentyl glycol diglycidyl ether, trimethylolpropane triglycidyl ether, pentaerythritol polyglycidyl ether, sorbitol polyglycidyl ether, adipic acid diolycidyl ester, phthalic acid diglycidyl ester, tris(glycidyl) isocyanurate, tris(glycidoxy ethyl) isocyanurate, 1,3-bis (N,N-diglycidyl aminomethyl)cyclohexane, N,N,N',N'-tetraglycidyl-m-xylylene diamine, and the like.

Examples of the melamine-based cross-linking agent may include hexamethylol melamine, hexamethoxymethyl melamine, hexabutoxymethyl melamine, and the like.

This cross-linking agent may be contained in a content of 0.1 to 2 parts by weight, and preferably 0.3 to 1 part by weight, based on 100 parts by weight of the acryl-based copolymer. If the content of the cross-linking agent is less than 0.1 parts by weight, the cohesive strength is decreased due to the insufficient degree of cross-linking, causing deteriorations in adhesive durability and cuttability. If the content of the cross-linking agent is more than 2 parts by weight, a problem may occur in reducing the residual stress due to an excessive cross-linkage reaction.

In addition, the adhesive composition may further include an anti-static agent, and an ionic anti-static agent is preferable. The ionic anti-static agent is an ionic salt composed of an anion and a cation, and the kind of the ionic anti-static agent is not particularly limited as long as it can give ion conductivity to an adhesive.

Specifically, the ionic anti-static agent may be an ionic salt composed of: a cation selected from the group consisting of an alkali metal salt, an ammonium salt, a sulfonium salt, and a phosphonium salt; and an anion selected from the group consisting of a fluorine-containing inorganic salt, a fluorine-containing organic salt, and an iodide ion. Of these, in consideration of adhesive durability such as heat resistance and moisture-heat resistance, an anti-static agent containing an anion of a fluorine-containing inorganic salt or a fluorine-containing organic salt is preferable.

This ionic anti-static agent may be contained in a content of 0.5 to 5.0 parts by weight and preferably 1 to 2 parts by weight, based on 100 parts by weight of the acryl-based copolymer. Less than 0.5 parts by weight of the ionic anti-static agent may result in an insufficient anti-static property, and more than 5 parts by weight of the ionic anti-static agent may fail to secure the durability.

The adhesive composition may further include, besides the above components, additives such as a tackifier resin, an anti-oxidant agent, a leveling agent, a surface lubricant, a dye, a pigment, a defoamer, a filler, and a light stabilizer, in order to control the adhesive strength, cohesive strength, viscosity, elastic modulus, glass transition temperature, and the like thereof, which are required according to the use of the adhesive. The contents of these additives may be appropriately controlled within ranges where the effects of the present invention are not impaired.

Preferably, the adhesive composition of the present invention does not contain a coupling agent that has been conventionally used in the art, in consideration of durability.

The adhesive composition of the present invention may be used as an adhesive for bonding a polarizing plate to a liquid crystal cell or an adhesive for a surface protection film. Also, the adhesive composition of the present invention may be used for a protection film, a reflection sheet, an adhesive sheet for shaping, an adhesive sheet for a photograph, an adhesive sheet for lane marking, an optical adhesive product, and an adhesive for an electronic product. It may also be used for an adhesive sheet product for general commercials and a patch for medical purposes.

Hereinafter, although preferable examples are provided to help understanding of the present invention, the following examples are provided merely to illustrate the present invention. It is obvious to those skilled in the art that various changes and modifications can be made within the scope and technical range of the present invention and these changes and modification are included in the accompanying claims.

PREPARATIVE EXAMPLE

Acryl-Based Copolymer

Preparative Example 1

A monomer mixture of 86 parts by weight of n-butylacrylate (BA), 8 parts by weight of benzylmethacrylate (BzMA), 1 part by weight of 4-hydroxybutylacrylate (4-HBA), and 5 parts by weight of acrylic acid (AA) was fed into a 1 L reactor equipped with a cooling device for facilitating the reflux of nitrogen gas and the control of temperature, and then 100 parts by weight of ethyl acetate (EAc) as a solvent was fed thereinto. After that, nitrogen gas was purged for 1 hour to remove oxygen, and then the temperature was maintained at 80° C. The mixture was homogeneously stirred. Then, 0.07 parts by weight of azobisisobutyronitrile (AIBN) as a reaction initiator was fed thereinto, followed by reaction for 8 hours, thereby preparing an acryl-based copolymer (weight average molecular weight: about 1,000,000).

Preparative Example 2

A monomer mixture of 86 parts by weight of n-butylacrylate (BA), 6 parts by weight of methylacrylate (MA), 1 part by weight of 2-hydroxyethylacrylate, and 5 parts by weight of acrylic acid was fed into a 1 L reactor equipped with a cooling device for facilitating the reflux of nitrogen gas and the control of temperature, and then 100 parts by weight of ethylacetate (EAc) as a solvent was fed thereinto. After that, nitrogen gas was purged for 1 hour to remove oxygen, and then the temperature was maintained at 62° C. The mixture was homogeneously stirred. Then, 0.07 parts by weight of azobisisobutyronitrile (AIBN) as a reaction initiator was fed thereinto, followed by reaction for 8 hours, thereby preparing an acryl-based copolymer (weight average molecular weight: about 1,000,000).

Examples 1 to 14 and Comparative Examples 1 to 6

The acryl-based copolymers from the preparative examples, an anti-static agent, a silane-based compound, and a cross-linking agent were mixed according to the compositions shown in Table 1 below, and then the mixtures were diluted to 28 wt %, thereby preparing adhesive compositions.

TABLE 1

| Classification (part by weight) | Acryl-based copolymer, Preparative example | Cross-linking agent (A) | Silane-based compound (B) | | | | | | | | | Anti-static agent (C) | | |
|---|---|---|---|---|---|---|---|---|---|---|---|---|---|---|
| | | | 1 | 2 | 3 | 4 | 5 | 6 | 7 | 8 | 9 | 1 | 2 | 3 |
| Example 1 | 1, 100 | A-1, 0.5 | 0.1 | — | — | — | — | — | — | — | — | 2 | — | — |
| Example 2 | 1, 100 | A-1, 0.5 | 0.5 | — | — | — | — | — | — | — | — | 2 | — | — |
| Example 3 | 1, 100 | A-1, 0.5 | 0.7 | — | — | — | — | — | — | — | — | 2 | — | — |
| Example 4 | 1, 100 | A-1, 0.5 | 1 | — | — | — | — | — | — | — | — | 2 | — | — |
| Example 5 | 1, 100 | A-1, 0.5 | 2 | — | — | — | — | — | — | — | — | — | — | — |
| Example 6 | 1, 100 | A-1, 0.5 | — | 0.5 | — | — | — | — | — | — | — | 2 | — | — |
| Example 7 | 1, 100 | A-1, 0.5 | — | — | 0.5 | — | — | — | — | — | — | 2 | — | — |
| Example 8 | 1, 100 | A-1, 0.5 | — | — | — | 0.5 | — | — | — | — | — | 2 | — | — |
| Example 9 | 1, 100 | A-2, 0.5 | 0.5 | — | — | — | — | — | — | — | — | 2 | — | — |
| Example 10 | 1, 100 | A-3, 0.5 | 0.5 | — | — | — | — | — | — | — | — | 2 | — | — |
| Example 11 | 1, 100 | A-4, 0.5 | 0.5 | — | — | — | — | — | — | — | — | 2 | — | — |
| Example 12 | 1, 100 | A-1, 0.5 | 0.5 | — | — | — | — | — | — | — | — | — | 2 | — |
| Example 13 | 1, 100 | A-1, 0.5 | 0.5 | — | — | — | — | — | — | — | — | — | — | 2 |
| Example 14 | 2, 100 | A-1, 0.5 | 0.5 | — | — | — | — | — | — | — | — | 2 | — | — |
| Comparative Example 1 | 1, 100 | A-1, 0.5 | — | — | — | — | 0.5 | — | — | — | — | 2 | — | — |
| Comparative Example 2 | 1, 100 | A-1, 0.5 | — | — | — | — | — | 0.5 | — | — | — | 2 | — | — |
| Comparative Example 3 | 1, 100 | A-1, 0.5 | — | — | — | — | — | — | 0.5 | — | — | 2 | — | — |
| Comparative Example 4 | 1, 100 | A-1, 0.5 | — | — | — | — | — | — | — | 0.5 | — | 2 | — | — |
| Comparative Example 5 | 1, 100 | A-1, 0.5 | — | — | — | — | — | — | — | — | 0.5 | 2 | — | — |
| Comparative Example 6 | 2, 100 | A-1, 0.5 | — | — | — | — | 0.5 | — | — | — | — | 2 | — | — |

A-1: Coronate-L (TDI-TMP adduct, Urethane Co., Ltd, Japan)
A-2: Coronate-HXR (isocyanurate of HDI, Urethane Co., Ltd, Japan)
A-3: D110N (HDI-TMP adduct, Mitsui Chemical)
A-4: D140N (IPDI-TMP adduct, Mitsui Chemical)

B-1:
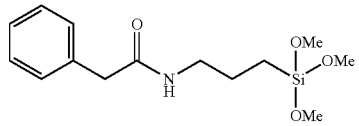

B-2:
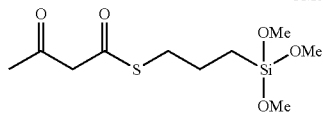

B-3:
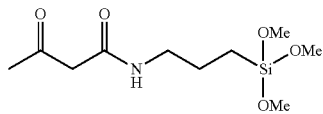

B-4:
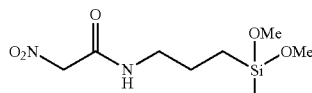

B-5:
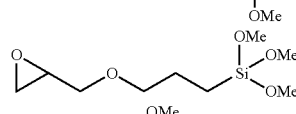

B-6:
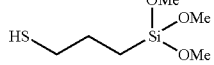

TABLE 1-continued

| Classification (part by weight) | Acryl-based copolymer, Preparative example | Cross-linking agent (A) | Silane-based compound (B) | | | | | | | | Anti-static agent (C) | | |
|---|---|---|---|---|---|---|---|---|---|---|---|---|---|
| | | | 1 | 2 | 3 | 4 | 5 | 6 | 7 | 8 | 9 | 1 | 2 | 3 |

B-7: OCN–(CH₂)₃–Si(OMe)₃

B-8: CH₂=CH–C(O)–O–(CH₂)₃–Si(OMe)₃

B-9: CH₃–C(O)–CH₂–C(O)–O–(CH₂)₃–Si(OMe)₃

C-1: Fluorosulfonylimide potassium salt (KFSI, Mitsubishi)
C-2: Trifluoromethanesulfonylimide lithium salt (HQ-115, 3M)
C-3: 1-octyl-4-methylpyridinium hexafluorophosphate Each adhesive composition prepared as above was coated on a release film coated with a silicon release agent to have a thickness of 25 μm followed by drying at 100° C. for 1 minute, thereby forming an adhesive layer.

The thus formed adhesive layer was allowed to adhere to a 185 μm-thick iodine-based polarizing plate through adhesion processing, thereby manufacturing a polarizing plate with an adhesive adhering thereon. The manufactured polarizing plate was kept under conditions of 23° C. and 60% RH for a curing period.

Test Examples

Physical properties of the adhesive compositions and polarizing plates with an adhesive adhering thereon, which were obtained from the examples and comparative examples, were measured by the following methods, and the measurement results were shown in Table 2.

1. Adhesive Strength (N/25 mm)

The manufactured polarizing plate with an adhesive was cut to 25 mm×100 mm, and then the release film was peeled therefrom. The resultant polarizing plate was laminated onto a glass substrate (Corning #1737, Corning Inc.) through a pressure of 0.25 MPa, and then subjected to autoclave treatment, thereby preparing a sample for evaluation.

For the measurement of the initial adhesive strength, a sample was left for 24 hours under conditions of 23° C. and 50% RH, and for the measurement of the adhesive strength at increased temperature, a sample was left for 48 hours under conditions of 50° C. and 50% RH. The initial adhesive strength and the adhesive strength at increased temperature were, respectively, measured on the samples using a universal tensile tester (UTM, Instron) when the adhesive layers were peeled off from the glass substrate at a peeling rate of 300 mm/min and a peeling angle of 180°. Here, the measurement was conducted under conditions of 23° C. and 50% RH.

2. Durability (Heat Resistance, Moisture-Heat Resistance)

A sample was manufactured by cutting the manufactured polarizing plate with an adhesive adhering thereon into a size of 90 mm×170 mm, peeling the release film therefrom, and then attaching the resultant polarizing plates on both surfaces of a glass substrate (110 mm×190 mm×0.7 mill) such that optical absorption axes of the polarizing plates were orthogonal to each other. Here, the applied pressure was 5 kg/cm², and clean room work was conducted to prevent the generation of bubbles or foreign materials. For the measurement of heat resistance, the sample was left at a temperature of 80° C. for 1000 hours, and then the occurrence or non-occurrence of bubbling or peeling was observed. For the measurement of moisture-heat resistance, the sample was left for 1000 hours under the conditions of 60° C. and 90% RH, and then the occurrence or non-occurrence of bubbling or peeling was observed. Here, the sample was left at normal temperature for 24 hours shortly before the state of the sample was evaluated.

<Evaluation Standard>

◎: No bubbles or peelings:

○: Number of bubbles or peelings <5

Δ: 5≤Number of bubbles or peelings <10 x: 10≤Number of bubbles or peelings

3. Reworkability

The polarizing plate was cut into 25 mm×100 mm in width and length, and then the release film was peeled off. The polarizing plate was laminated to a Corning #1737 glass substrate at a pressure of 0.25 MPa, and then subjected to autoclave treatment for 20 minutes under conditions of 5 atm and 50° C. thereby preparing a sample for evaluation. The sample was put in an oven at 80° C. for heat resistance conditions, and then taken out therefrom after ten hours. Then, the sample was left at room temperature for 120 hours, and then the adhesive was peeled off at a rate of 1.3 cm/s.

<Evaluation Standard>

The adhesive did not remain on the panel and the adhesive was clearly peeled off without the tearing of the polarizing plate: ○

The adhesive remained on the panel or the polarizing plate was torn during the peeling procedure: x

TABLE 2

| Classification | Adhesive strength (N/25 mm) | | | Durability | | Reworkability |
|---|---|---|---|---|---|---|
| | Initial (A) | Increased temperature (B) | B/A | Heat resistance | Moisture heat resistance | |
| Example 1 | 9 | 10 | 1.1 | ⊙ | ⊙ | ○ |
| Example 2 | 10 | 11 | 1.1 | ⊙ | ⊙ | ○ |
| Example 3 | 9 | 11 | 1.2 | ⊙ | ⊙ | ○ |
| Example 4 | 8 | 12 | 1.5 | ⊙ | ⊙ | ○ |
| Example 5 | 8 | 11 | 1.4 | ○ | ⊙ | ○ |
| Example 6 | 5 | 9 | 1.8 | ○ | ⊙ | ○ |
| Example 7 | 8 | 13 | 1.6 | ○ | ⊙ | ○ |
| Example 8 | 9 | 18 | 2.0 | ○ | ⊙ | ○ |
| Example 9 | 7 | 12 | 1.7 | ○ | ⊙ | ○ |
| Example 10 | 9 | 14 | 1.6 | ○ | ⊙ | ○ |
| Example 11 | 8 | 13 | 1.6 | ○ | ⊙ | ○ |
| Example 12 | 8 | 10 | 1.3 | ⊙ | ⊙ | ○ |
| Example 13 | 4 | 7 | 1.8 | ○ | ○ | ○ |
| Example 14 | 10 | 12 | 1.2 | ⊙ | ⊙ | ○ |
| Comparative Example 1 | 3 | 26 | 8.7 | ⊙ | ⊙ | X |
| Comparative Example 2 | 5 | 28 | 5.6 | ⊙ | ⊙ | X |
| Comparative Example 3 | 7 | 29 | 4.1 | ⊙ | ⊙ | X |
| Comparative Example 4 | 1.8 | 8.5 | 4.7 | X | X | ○ |
| Comparative Example 5 | 2 | 18 | 1.1 | X | ○ | ○ |
| Comparative Example 6 | 4 | 31 | 7.8 | ⊙ | ⊙ | X |

As can be seen from Table 2 above, the adhesive compositions of Examples 1 to 14 according to the present invention were superior as compared with the adhesive compositions of Comparative Examples 1 to 6 in terms of both adhesive durability, such as heat resistance and moisture-heat resistance, and reworkability As set forth above, the adhesive composition of the present invention can have excellent adhesive durability under strict conditions (high temperature or high temperature and humidity). Further, the adhesive of the present invention has an advantage in that it does not remain on the substrate at the time of re-peeling (reworkability) since the adhesive strength of the adhesive composition of the present invention does not excessively increase even under high temperature or high temperature and humidity.

What is claimed is:

1. An adhesive composition whose initial adhesive strength (A) and adhesive strength at increased temperature (B) satisfy a ratio (B/A) of 2.0 or lower,
    wherein the initial adhesive strength (A) is measured through a peeling test after a sample is left for 24 hours at 23° C. and 50% relative humidity (RH), and the adhesive strength at increased temperature (B) is measured through a peeling test after a sample is left for 48 hours at 50° C. and 50% RH;
    the sample is prepared by laminating an adhesive-attached polarizing plate having a size of 25 mm×100 mm on a glass substrate at a pressure of 0.25 MPa and treating the laminate in an autoclave, the adhesive being formed from the adhesive composition; and
    the peeling test is performed by peeling the adhesive from the glass substrate at a peeling rate of 300 mm/min and a peeling angle of 180° using a universal testing machine (UTM).

2. The adhesive composition of claim 1, wherein the ratio (B/A) of the adhesive strength at increased temperature (B) to the initial adhesive strength (A) is 1.5 or lower.

3. The adhesive composition of claim 1, wherein the initial adhesive strength is 2 to 10 N/25 mm.

4. The adhesive composition of claim 1, wherein the adhesive strength at increased temperature is 2.5 to 15 N/25 mm.

5. The adhesive composition of claim 1, wherein the adhesive composition contains an acryl-based copolymer and at least one silane-based compound selected from the group consisting of compounds of Chemical Formulas 1 to 6:

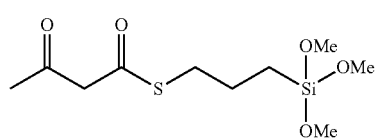

Chemical Formula 1

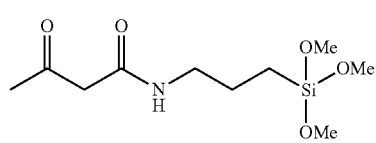

Chemical Formula 2

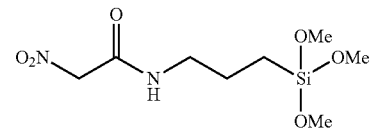

Chemical Formula 3

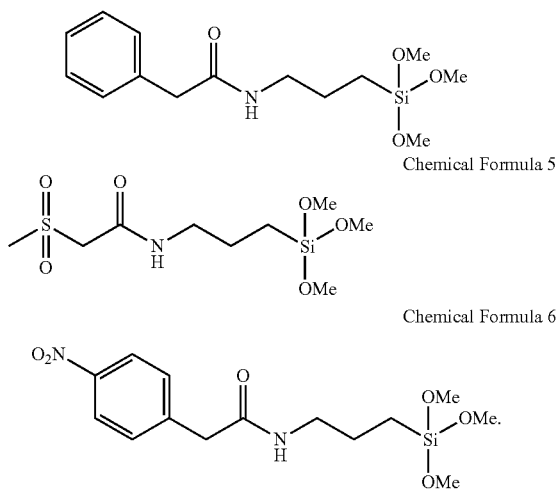

6. The adhesive composition of claim 5, wherein the silane-based compound is contained in a content of 0.01 to 5 parts by weight based on 100 parts by weight of the acryl-based copolymer.

7. The adhesive composition of claim 5, further comprising a cross-linking agent.

8. The adhesive composition of claim 7, wherein the cross-linking agent is a tolylene diisocyanate-based cross-linking agent.

9. The adhesive composition of claim 5, further comprising an anti-static agent.

10. The adhesive composition of claim 9, wherein the anti-static agent contains an anion of a fluorine-containing inorganic salt or fluorine-containing organic salt.

11. The adhesive composition of claim 2, wherein the initial adhesive strength is 2 to 10 N/25 mm.

12. The adhesive composition of claim 2, wherein the adhesive strength at increased temperature is 2.5 to 15 N/25 mm.

* * * * *